March 31, 1964  J. J. GRIFFITHS ETAL  3,127,046
PRESSURE VESSELS
Filed July 6, 1960
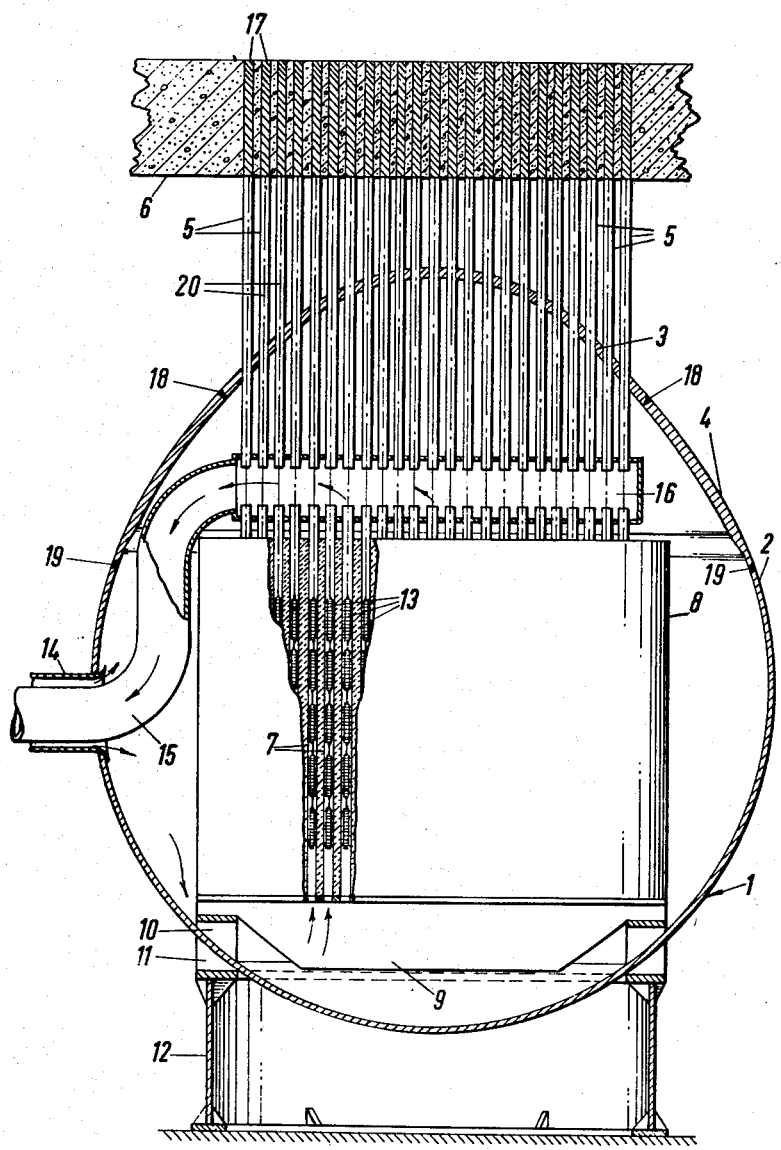
INVENTORS
JACK JONES GRIFFITHS
RONALD SCOTT CHALLENDER
BY
*Lawey and Taylor*

United States Patent Office 3,127,046
Patented Mar. 31, 1964

3,127,046
PRESSURE VESSELS
Jack Jones Griffiths, Culcheth, and Ronald Scott Challender, Warrington, England, assignors to United Kingdom Atomic Energy Authority, London, England
Filed July 6, 1960, Ser. No. 41,130
Claims priority, application Great Britain July 16, 1959
2 Claims. (Cl. 220—3)

This invention relates to spherical pressure vessels suitable for nuclear reactors.

The provision of an access hole through a nuclear reactor pressure vessel introduces the problem of strengthening the pressure vessel in the region of the access hole. The greater the density of the access holes the greater the strengthening of the unperforated parts of the pressure vessel that is required. Thus, at one time, design effort was directed to providing one access hole in a nuclear reactor pressure vessel to give access to a group of fuel channels in the reactor, rather than provide one access hole for each fuel channel, in order to keep the density of access holes to a low figure. This concept of one access hole for a group of fuel channels greatly complicates refueling arrangements and therefore an object exists to have one access hole per fuel channel or, at least, to reduce the number of fuel channels serviced from one access hole to a minimum.

With the above object in mind the present invention uses the concept of thickening a spherical pressure vessel in the region perforated by a close-spaced series of access holes in combination with an increase of curvature in said region (that is, a reduced radius of curvature). Thus there is brought forth a nuclear reactor pressure vessel having three sections, namely, a basic section of spherical form and greater than a hemisphere, a subsidiary section thickened relative to the basic section and of greater curvature than the basic section, a joining section between the basic and subsidiary sections and access tubes penetrating the subsidiary section.

An embodiment of the invention will now be described by way of example with reference to the accompanying drawings, wherein the sole figure is a partly diagrammatic side view in medial section.

Referring to the drawings, in the construction shown therein as applied by way of example to a nuclear reactor pressure vessel, the pressure vessel 1 has a basic section 2 which is of spherical form and greater than a hemisphere, a subsidiary section 3 which is thickened relative to the basic section 2 and of smaller curvature, i.e. of smaller diameter, than that of the section 2 and a joining section 4 which is of curved section and is joined to the sections 2 and 3 by weld joints 18, 19. The section 3 is shown disposed at the top of the vessel 1 which is intended for a nuclear reactor employing top charging; where the reactor is intended for bottom or side charging, the section 3 would be disposed at the bottom or side of the vessel 1 respectively. The section 3 is perforated to accommodate a plurality of stand pipes 5, each of which provides access from the upper face of a biological shield 6 to a fuel element channel 7 within a graphite moderator and reflector structure 8, the pipes 5 being sealed by removable shield plugs 17.

The structure 8 is supported within the pressure vessel 1 upon a grid 9, the grid 9 being supported in turn by stools 10 welded to the lower inner wall of the basic section 2. Stools 11 welded to the lower outer wall of the basic section 2, opposite the stools 10 on the inner wall thereof transmit the weight of the structure 8 and grid 9 to an external ring support 12. The stools 11 also transmit the weight of the basic section 2 and hence the subsidiary and joining sections 3 and 4 respectively.

The channels 7 are shown fuelled with fuel elements 13 inter-connected to form strings suspended by cables 20 from the plugs 17. Co-axial ducts 14, 15 are provided for gaseous coolant flow through the reactor, the coolant entering the outer duct 14, passing upward through the fuel element channels 7 to collect in a header 16 before leaving the vessel 1 by way of the inner duct 15.

Typical dimensions of a pressure vessel constructed according to the invention are:

Diameter of basic section 2—46 ft.
Diameter of subsidiary section 3—40 ft.
Distance between centres of basic section 2 and subsidiary section 3—17 ft. 6 ins.
Radius of curvature of intermediate section 4—47 ft. 8 ins.
Thickness of basic section 2—3⅜ ins.
Thickness of joining section 4—5 ins.
Thickness of subsidiary section 3—5 ins.
No. of standpipes 5—922 on 12.65 ins. triangular pitch.
Dimensions of stand pipes 5—6.75 ins. bore x 1.2 ins. thick.

Such a pressure vessel is calculated to withstand working pressures up to 300 p.s.i.

The moderator and reflector structure 8, the header 16 and the grid 9 occupy a generally cylindrical reactor core space of roughly 40 ft. in diameter and 44 ft. in height.

It is of interest to consider the relative positions with and without use of the invention.

A spherical vessel having core space of the same size as that enclosed by the vessel according to the invention would be 55 ft. in diameter. If it were strengthened up to 5 ins. thickness (a reasonable maximum thickness for site welding) in the region of the stand pipes 5, it would accept a pressure of 218 p.s.i. for an allowable stress of 15,000 p.s.i. (the stand pipes 5 having a 6.75" bore 1.2" wall thickness and a 12.65" triangular pitch).

Using the invention and the typical dimensions given above (i.e. 40 ft. diameter for the subsidiary section 3 and 46 ft. diameter for the basic section 2), the pressure that could now be accommodated for the same thickness (5 ins.) of metal in the region of the pipes 5 would be 300 p.s.i. This pressure gain of 37% can be translated (by estimation) into a reduction of coolant pumping power by a factor of 1.9 which could mean in a reactor generating 1000 mw. of heat the saving of 40 mw. of electricity.

We claim:

1. For a nuclear reactor, an improved pressure vessel of fundamentally spherical form defined by a basic section of spherical form greater than a hemisphere, a subsidiary section thicker than the basic section and of greater curvature than the basic section, a joining section joining the basic and subsidiary sections and access holes penetrating the subsidiary section.

2. A pressure vessel for a nuclear reactor comprising a shell having a base section of truncated spherical form greater than a hemisphere, a part-spherical cap section above the base section and having a smaller radius of curvature than said base section, and a truncated curved conical section joining the base and cap sections, said cap section defining access holes for the vessel and having a greater thickness than said base section.

References Cited in the file of this patent

Proceedings of the Second United Nations International Conference on the Peaceful Uses of Atomic Energy, (1958) vol. 8, pp. 424, 425, 429.

Heavy Water Moderated Power Reactors, March 1958 (DP–285) pp. 16, 17, 47 and 48.

Nucleonics, 17 No. 4, April 1959, pp. 86–93.